Aug. 27, 1929.   J. SNEED   1,726,045
BRAKE MOUNTING
Filed June 8, 1927
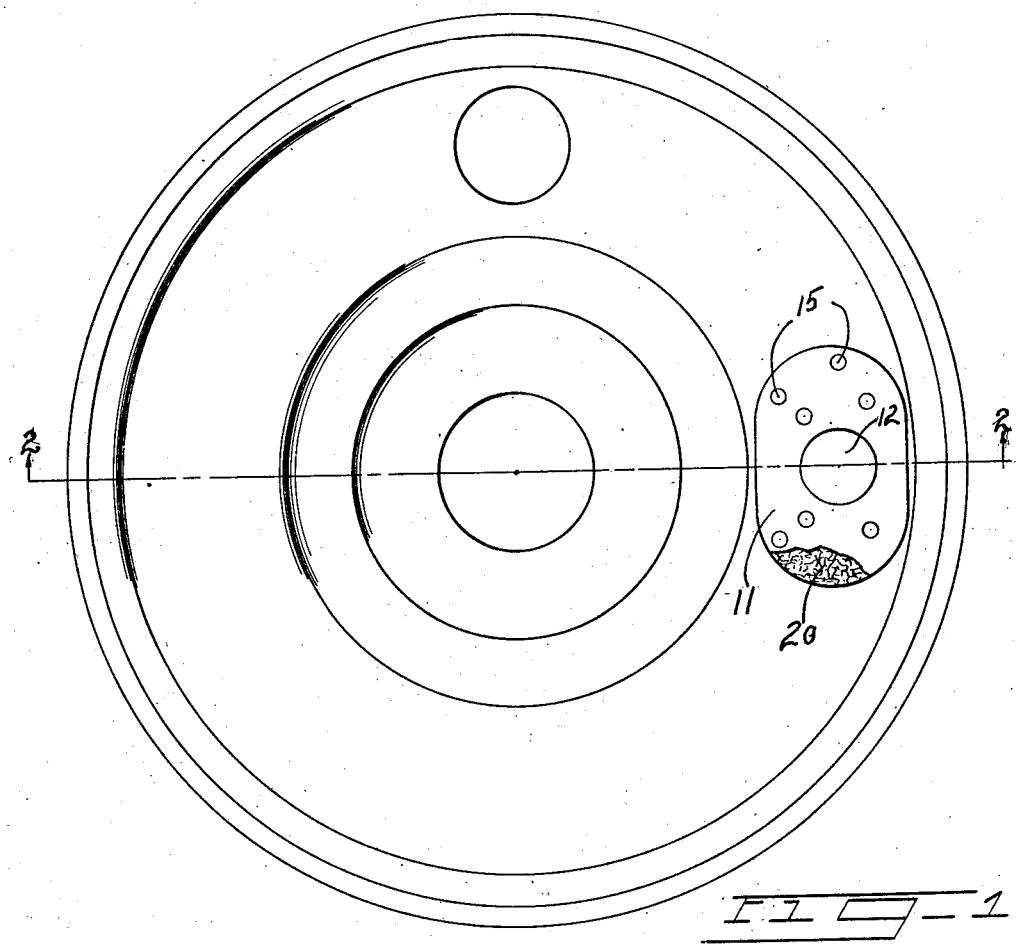
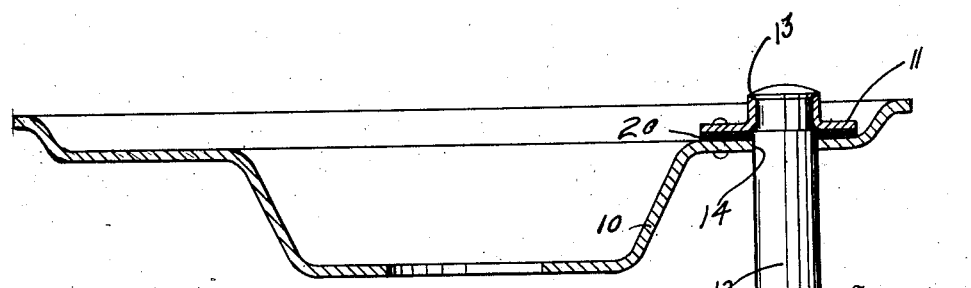

Patented Aug. 27, 1929.

1,726,045

UNITED STATES PATENT OFFICE.

JOHN SNEED, OF DETROIT, MICHIGAN, ASSIGNOR TO THE MIDLAND STEEL PRODUCTS COMPANY, OF CLEVELAND, OHIO, A CORPORATION OF OHIO.

BRAKE MOUNTING.

Application filed June 8, 1927. Serial No. 197,330.

This invention relates to brakes and is illustrated as embodied in a backing plate for an automobile brake.

An object of the invention is to prevent the building up of vibrations in the plate which would otherwise cause an annoying sound, frequently termed "drumming."

It has been found that when a brake is in operation, that is, when the shoe is in contact with the brake drum, that the shoe delivers to the anchor pin or to such brake applying means as will stand in a similar relation, a vibration which, when transmitted to the backing plate cause the plate to vibrate so as to give forth a sound, the pitch of which depends upon both the pressure of brake application and the sound characteristic of the plate.

It is among the objects of my invention to deaden the vibrations in the anchor plate by dampening the vibration near the point where it is set up by the anchor pin or other means, on one hand, and on the other hand by delivering to the backing plate vibrations which are out of phase with the original vibration and tend to negative the vibration so that the drumming is eliminated.

Other objects will appear from the following more detailed description of my invention. The essential characteristics are summarized in the claims.

Fig. 1 is a front elevation of an illustrative brake backing plate with an anchor carrying bracket secured thereto; Fig. 2 is a section of line 2—2 on Fig. 1.

In illustrating my invention, I have shown one anchor pin which extends through and may be in contact with the backing plate and is carried by a bracket, which bracket in turn is secured to the plate.

Thus, in the drawings, I show the plate 10 to which is secured the bracket 11. The bracket, in turn, carries the pin 12. The pin is fixed to the bracket as at 13 and the preferred form of my invention may be in close contact with the plate at the opening 14. Suitable rivets 15 or other means hold the bracket to the plate.

Disposed between the bracket and the plate, I provide a sheet of material 20 which has different physical characteristics from the material of the plate. The sheet 20 may be made of rubber, leather, paper pulp or other material which will not vibrate in consonance with the plate and which will transmit vibrations through itself with such delay as to deliver vibrations out of phase with those which are delivered to it.

If the pin 12 delivers all its vibration to the bracket 11, then the sheet 20 will serve to dampen the vibrations delivered to the plate, so that the drumming will be stopped in its inception. However, the pin 12 may contact with the plate at 14 and furthermore, the rivets 15 may deliver vibrations directly to the plate so that the function of the sheet 20 in this event, is to transmit vibrations to and from the bracket and the plate, but to do so to effect both a lag and a dampening in the delivery which will result in the breaking up or opposition to the vibrations of the plate.

It has been found that the anchor pin delivers its vibration to the plate in the plane of the plate which vibrations in turn, appear normal to the plate at the point more or less remote from the pin. The sheet 20 being in close engagement with the plate at a point where the vibrations are strongest in the plane of the plate, tends of course, to dampen the source of plate vibration by reason of its extended area of contact with the plate at this point.

While one illustrative embodiment has been described, it is not my intention to limit the scope of the invention other than by the terms of the appended claims.

I claim:—

1. A backing plate for a brake adapted to carry an anchor pin, and material having vibration dampening characteristics secured to the plate over an area adjacent the point of engagement between the plate and said pin.

2. The combination of a backing plate for a brake, an anchor pin carried thereby, and material having different physical vibration characteristics from the plate and secured to the plate adjacent the point of engagement between the plate and said pin.

3. The combination of a backing plate for a brake, brake anchoring means, a bracket adapted to carry said anchoring means and material having different physical characteristics from the plate secured between the bracket and plate for dampening vibration.

4. The combination of a backing plate for a brake, a bracket adapted to take braking reaction and a shim of material having different physical characteristics from the plate and positioned between the bracket and said plate to prevent vibration.

5. The combination of a backing plate for a brake, an anchor pin in contact therewith, a bracket adapted to carry said anchor pin and a shim of material having different physical characteristics from the plate and secured between the bracket and plate for neutralizing vibration in the plate.

6. In combination a backing plate for a brake, a bracket through which brake reacting torque is transmitted to the plate, a sheet of material having different physical characteristics and being secured between the bracket and the plate, and means having physical characteristics similar to the plate and engaging the plate and the bracket whereby vibrations are delivered from the bracket to the plate in different phases to neutralize vibration therein.

In testimony whereof, I hereunto affix my signature.

JOHN SNEED.